Sept. 23, 1958   E. J. SVENSON   2,853,322
ROTARY SEAL FOR RECIPROCABLE ROTARY VALVES
Filed May 5, 1955
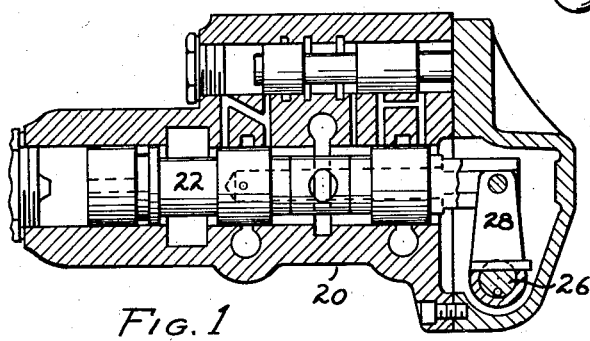
FIG. 1
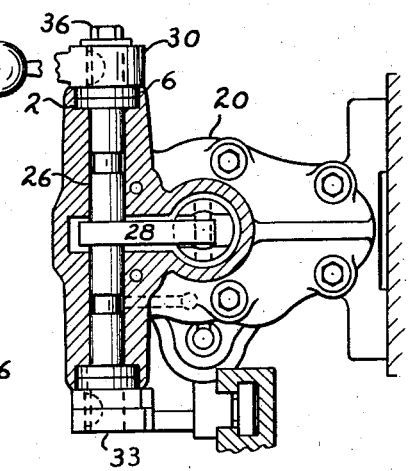
FIG. 3
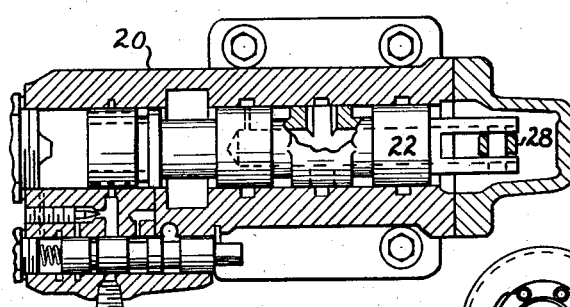
FIG. 2
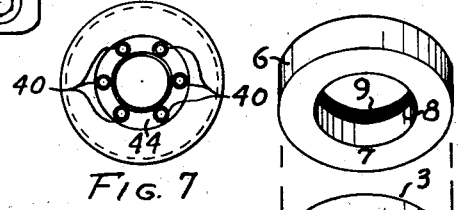
FIG. 7
FIG. 5
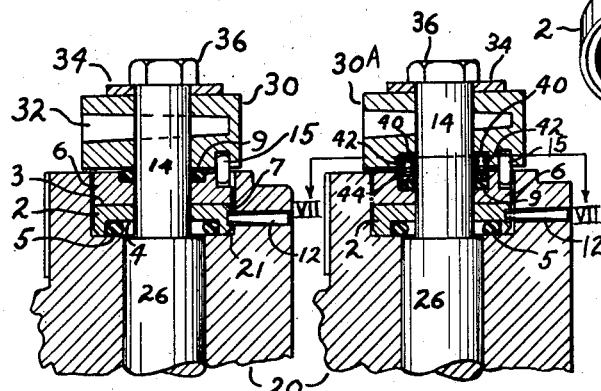
FIG. 4   FIG. 6
INVENTOR.
ERNEST J. SVENSON
BY James J. Barr
ATTORNEY

United States Patent Office 2,853,322
Patented Sept. 23, 1958

2,853,322

ROTARY SEAL FOR RECIPROCABLE ROTARY VALVES

Ernest J. Svenson, Rockford, Ill.

Application May 5, 1955, Serial No. 506,161

3 Claims. (Cl. 286—11.13)

This invention relates to a novel seal for use with valve structures or like devices to prevent leakage of pressure fluid therefrom.

More particularly it relates to a seal assembly comprised of two mated, lapped and abutting members, formed of the same material, which are flexibly arranged in conjunction with a rotatable valve shaft and a valve body to permit external operation of the valve while preventing leakage of pressure fluid therefrom.

In valve structures utilized for controlling fluid power flow in connection with hydraulic machine tool actuation and the like, the valve is mechanically actuated in response to the relative movement between a member being externally shifted and the valve body proper. This movement is generally occasioned by a traveling member moving at high speeds and impactly engaging an exterior portion of the valve shaft, which in turn shifts the internal mechanism of the valve. This impact engagement at the extreme end of the shaft momentarily deflects the shaft from its normal axial position and because of the proximity of the seal creates an opening between the seal and the valve body or the seal and the shaft, which presents a place for leakage. This may be more readily understood when it is realized that valves of this type and usage, control an hydraulic fluid under pressure, which at the time of actuation or impact engagement, causes a fluid displacement within the valve body that is communicated to the seal location as a jet of fluid and in conjunction with the opening created, causes leakage from the valve body exteriorly of the seal.

Heretofore the problem described was presented to various manufacturers of seals and each attempted solution of the problem with no success. The subject invention solved the problem by providing a seal arrangement utilizing the characteristics of materials which are capable of being lapped and wrung together, such as gage blocks, wherein two members formed of the same material selected from such materials are machined, lapped, hardened and wrung together, whereby their abutting lapped surfaces are capable of providing sealing surfaces such that relative rotary and frictionless movement therebetween is permitted while axial separation is prevented.

Therefore, an object of the invention is to provide a seal assembly for a valve structure, as above, wherein the two similar seal members are adhesively and axially aligned on a valve shaft with conventional type sealing means such as O-rings and flexibly disposed as a unit relative to the valve body to follow momentary deflections of the shaft to maintain a proper seal under the most rigorous conditions of usage.

Another object of the invention is to provide a seal assembly, as above, in which a spring or similar biasing means is utilized to maintain the seal assembly under compression against the valve body.

With the above and other objects in view which will be apparent from the following description to those skilled in the art to which the invention appertains, the invention relates to a combination of parts to be hereinafter described with reference to the accompanying drawing, in which:

Figure 1 is a vertical sectional view of the valve mechanism embodying the present invention;

Figure 2 is a horizontal sectional view of the valve mechanism of Figure 1;

Figure 3 is an end sectional view of the valve mechanism of Figure 1;

Figure 4 is an enlarged sectional view of a portion of Figure 3;

Figure 5 is an exploded perspective view of the seal assembly;

Figure 6 is a view similar to Figure 4 and illustrating a modified form of the invention; and Figure 7 is a sectional view taken along the line VII—VII of Figure 6.

Referring now to Figs. 1, 2, and 3, a valve body 20 provides a receptacle for the valve mechanism and forming a part thereof is a main control valve 22 which is longitudinally shiftable therein to control the flow of an hydraulic fluid from an external pumping source (not shown) to an operatively associated hydraulically actuated device (not shown). The apparatus not shown may be of a conventional nature as used in a typical hydraulic circuit and application. The control valve 22 is externally actuable by means of a control handle 24 which is connected thereto by a rotatable shaft 26 and an arm 28. The handle 24 is positioned in proximity to a traveling member (not shown) which impactly engages the handle 24 in a reciprocating manner well known in the art. In operation this actuating force presents a twisting or torsional effect to the extremity of shaft 26 which momentarily deflects it at the seal location, while changing the operative position of the control valve 22. Thus the present invention contemplates the compensation of such deflection to preserve the sealing in a valve structure of this type and can be best described in connection therewith. The valve mechanism, with an ordinary seal, is more particularly described and claimed in the patent to Ernest J. Svenson, 2,363,707, issued on November 28, 1944, and herein shown for the purpose of providing an environment for the present invention.

Referring now to Figs. 3, 4, and 5, details of the seal assembly of the subject invention in connection with the above valve mechanism will now be described. The seal assembly comprises: a first seal member 2 formed with a flat machined surface 3 and an oppositely disposed channel 4 for the retention of an annular sealing means, such as an O-ring 5 or similar gasket material; and a second seal member 6 similarly formed with a flat machined surface 7 and an oppositely disposed channel 8 for the retention of another annular sealing means, such as an O-ring 9. The members 2 and 6 are formed of the same metal, such as a gray iron alloyed with .8% molybdenum, .6% copper, and .35% chromium, or similar metals which may be wrung together and hardened. It is contemplated that materials similar to those used in making gage blocks, such as "Johannson" blocks, or various types of steel, such as tool steel, could be similarly utilized in the present invention. After machining to the required size, the members 2 and 6 are lapped in a manner similar to the lapping of gage blocks until a high degree of flatness and finish is obtained. Generally, the degree of surface finish should exceed one-half to one micro-inch R. M. S. to provide optimum performance. The members 2 and 6 are then wrung together by the application of slight pressure and a rotary motion. The theory underlying the adhesive force which is created by this method has been explained as surface tension phenomenon, molecular attraction, or a bond formed between electrons sharing parts of the same orbit when placed in proximity. In either case it will be noted that the particular adhesive attraction results in marked resistance to axial separation while permitting frictionless rotary motion of the members relative to each other. It will be noted that other surface configurations, other than flat surfaces, may be utilized, such as for example, mated concave and convex surfaces. However, the practical features of utilizing flat surfaces are obvious.

The seal assembly, comprising members 2 and 6 and O-rings 5 and 9, is incorporated in the valve structure in the following manner. The seal member 2 is positioned innermost within the body 20 and loosely retained by means of a tapered pin 12. The member 2 is provided with a rounded or beveled corner opposite the lapped surface and in addition is machined on its peripheral surface to fit loosely within the body 20 so that in conjunction with the small end of the pin 12 permits slight rocking movement of member 2 relative to the body 20. The O-ring 5 is spaced concentrically away from the reduced portion 14 of shaft 26 along the shoulder 21 of body 20. The seal member 6 is positioned adjacent the seal member 2, machined to the same outer diameter as member 2, and securely retained relative to the collar 30 by means of a pin 15. The collar 30, integral with handle 24, is secured rigidly to the shaft 26 by means of a tapered pin 32 which is driven into tapered holes in the shaft 26 and collar 30. Note, that pin 12 is tapered to fit loosely in a straight hole, while pin 15 is a straight pin shorter than the overall length of the straight holes it retains. In assembling the seal within the body 20, the oppositely disposed collars 30 and 33 are compressed within a clamp which applies pressure to the seal assembly to seal the O-rings 5 and 9 against their cooperative surfaces, at which time the hole for pin 15 is made, the pin 15 driven in, and the retaining washer 34 and bolt 36 applied to maintain the compression after removal of the clamp.

Under operating conditions the valve mechanism is reciprocably actuated to impactly engage the control handle 24 in one direction which rotates the control shaft 26 through an arc of less than 180°. This movement is communicated through the arm 28 to slidably move the control valve 22 to a new operating position in conformity with a desired valving function. Reverse actuation again imparts an impact engagement with the handle 24 to reverse the direction of the control valve 22 to return it to its former or a new operating position. The impact engagement at the extremity of the shaft 26 imposes a torsional strain on the shaft 26 proximate to the seal assembly which deflects the shaft 26 from its normal axial plane. Also, the simultaneous actuation of the valve components introduces a fluid displacement within the body which presents itself at the seal location. With ordinary seals, heretofore utilized, this combination of factors resulted in a spurt of fluid externally of the valve body which was objectionable from many standpoints, as is well understood in the art. This may be further explained when it is noted that ordinary seals are either limited by necessity to inherently inflexible materials, such as graphite and bronze, or are composed of flexible materials adjacent the bearing surface which easily wear or adopt a set distortion. Also for purposes of providing the main sealing surface between the relatively movable parts of the seal assembly, a hard and a soft material are used in combination with the resultant wearing of the soft material by the hard material or separation therebetween which admits an abrasive material. In the subject invention these limitations are eliminated by the use of two seal members formed of the same hardened material with their abutting surfaces lapped and maintained in constant vacuum-like engagement throughout the life of the valve mechanism. With the arrangement herein disclosed, the close fit between the surfaces 7 and 3 precludes the admission of abrasive material and the use of identical materials prevents wear by a hard material against a softer adjacent material.

Thus, at the moment of impact, the seal assembly follows the shaft deflection, the adhesion attraction between the surfaces 3 and 7 maintains the members 2 and 6 in axial engagement, the loose fit of the assembly permits the seal deflection relative to the body 20, the O-ring 5 though slightly raised on one side maintains a tight seal because of the compression thereon, and the O-ring 9 is unaffected by the deflection because its adjacent components are similarly deflected. The deflection of the seal members 2 and 6 relative to the body 20 is permitted because of the beveled corner of member 2; the spacing between the peripheries of the members 2 and 6, and the body 20; and the slack engagement of the pin 12 and member 2; which allows slight gyroscopic movement of the seal assembly within the confines of the body 20. Because the surfaces 3 and 7 are held against axial separation while allowing rotary motion of the shaft 26, seal member 6 and collar 30 relative to the seal member 2 and the body 20, a tight seal is maintained between the shaft portion 14 and the periphery of member 6 which by its very nature usually presents the most likely location for leakage. Also the ancillary sealing provided by the O-ring 5 prevents leakage from the shaft 26 along the shoulder 21 and the periphery of member 2, and the O-ring 9 prevents leakage along the shaft portion 14 beyond the seal assembly.

Referring now to Figs. 6 and 7, a modified form of the invention is illustrated therein. In many applications using O-rings and similar gasket materials, it has been realized that after a period of time, they tend to lose resiliency and effect a set distortion. Therefore, their effectiveness as sealing means diminishes and generally requires periodic replacement by new active materials. In the embodiment herein shown, the seal assembly is maintained under a constant biasing force which obviates the condition referred to above. This biasing force is effected by providing several holes 40 within the collar 30A, wherein compression springs 42 are maintained under tension against a washer 44. The washer 44 is positioned within the channel 8 of member 6 and exerts the force of the springs 40 against the O-ring 9 and thereby against the seal members 2 and 6 and the O-ring 5. This biasing force aids the original assembly compression force, initially and after the valve mechanism has been repeatedly used keeps the resilient O-rings under constant compression irrespective of the original assembly force. It will be noted that this arrangement will also provide a constant working action for the O-rings which are generally formed of rubber and require such action to maintain their effective sealing qualities. It will also be apparent that the floating or gyroscopic action heretofore described will still be possible and permit flexibility of the seal assembly during deflection of the shaft 26. Other biasing means, such as a leaf spring, may be similarly utilized in this manner, without departing from the scope of the subject invention.

Also other objects and applications of the invention are apparent from the above description and it is to be understood that said invention is not limited to the specific disclosures herein, but is capable of other modifications within the scope of the appended claims.

What is claimed is:

1. A rotary seal structure comprising rotary shaft means, a body having an aperture therein rotatably receiving said rotary shaft means, a rotary member on said shaft means and rotatable therewith, and a seal on said shaft means adjacent said rotary member, said seal comprising a first rigid seal ring encircling said shaft and fixed relative to said body, said first seal ring encircling said shaft sufficiently tightly to preclude wobble or lateral shifting of said first seal ring, a resilient gasket member compressed between said first seal ring and said body, said first seal ring having an integral lapped radial face perpendicular to said shaft means, a second rigid seal ring encircling said shaft means and secured for rotation with said shaft means and relative to said body, said second seal ring encircling said shaft sufficiently tightly to preclude wobble or lateral shifting and having an integral lapped radial face perpendicular to said shaft means and sealingly engaging the lapped radial face of the first seal ring, and a resilient gasket member about said shaft means and compressed between said rotary member and said second seal ring.

2. A rotary seal structure as set forth in claim 1 wherein both seal rings are provided with annular recesses on the sides opposite the lapped surfaces, said resilient gaskets being mounted in said recesses, and one of said gaskets being under both axial and radial compression.

3. A rotary seal structure as set forth in claim 1 wherein said body is provided with an outwardly opening recess communicating with the aperture in said body, both of said seal rings being mounted substantially completely within said recess, said second seal ring having a notch in the side opposite the lapped surface opening both axially and radially of said second seal ring, a pin received in said rotary member and extending into said notch and fixing said second seal ring for rotation with said shaft means, said first seal ring having a radially opening notch, said body having a cylindrical aperture disposed radially of said shaft means and aligned with the radially opening notch in the first seal ring, and a tapered pin in said cylindrical aperture, said tapered pin having a large end in said body and preventing inadvertent radial outward movement of said pin, said pin having a relatively small end received in the radially opening notch of the first seal ring and fixing said first seal ring relative to said body but allowing a restricted degree of play upon radial deflection of said shaft means.

References Cited in the file of this patent

UNITED STATES PATENTS

| | | |
|---|---|---|
| 2,362,436 | Stratford | Nov. 7, 1944 |
| 2,363,707 | Svenson | Nov. 28, 1944 |
| 2,365,046 | Bottomley | Dec. 12, 1944 |
| 2,455,700 | Porges | Dec. 7, 1948 |
| 2,571,035 | Hastings | Oct. 9, 1951 |
| 2,628,852 | Voytech | Feb. 17, 1953 |
| 2,671,409 | Wright | Mar. 9, 1954 |